United States Patent [19]

Shimizu et al.

[11] 3,969,334

[45] July 13, 1976

[54] PROCESS FOR PREPARING GRANULAR CHLOROPRENE POLYMER RUBBER

[75] Inventors: Akihiko Shimizu; Yasuhiro Sakanaka, both of Shin-nanyo, Japan

[73] Assignee: Toyo Soda Manufacturing Co., Ltd., Japan

[22] Filed: Oct. 15, 1975

[21] Appl. No.: 622,454

[30] Foreign Application Priority Data

Oct. 15, 1974 Japan.............................. 49-117693

[52] U.S. Cl.................................. 526/17; 260/821; 526/29; 526/295; 528/488
[51] Int. Cl.². ........................ C08C 1/14; C08C 1/16
[58] Field of Search...................... 450/768.5, 614.5; 260/821, 92.3

[56] References Cited

UNITED STATES PATENTS

| 2,702,798 | 2/1955 | Burleigh et al. ............... 260/92.3 X |
| 2,948,701 | 9/1960 | Baker et al. ..................... 260/821 X |

*Primary Examiner*—William F. Hamrock
*Attorney, Agent, or Firm*—Oblon, Fisher, Spivak, McClelland & Maier

[57] ABSTRACT

This invention relates to a novel process of preparing chloroprene polymer rubber granules. The process comprises adding 4 to 10 wt. parts of sodium silicate to 100 wt. parts of a cationic latex of chloroprene polymer and then adding an alkaline earth metal salt or an acid to precipitate granules of the chloroprene polymer rubber.

5 Claims, No Drawings

PROCESS FOR PREPARING GRANULAR CHLOROPRENE POLYMER RUBBER

BACKGROUND OF THE INVENTION

1. Field Of The Invention

This invention relates to a novel process for preparing granular rubber. In particular, it relates to a process for preparing granular polymer rubber which comprises mixing sodium silicate with a chloroprene polymer rubber latex to coat the particles with a silicate or polysilicic acid. Next, an alkaline earth metal salt or an acid is added to form an aqueous dispersion of the chloroprene polymer rubber. The chloroprene polymer rubber then precipitates in the form of granules.

As used throughout the specification, the term "chloroprene polymer rubber" encompasses polychloroprene and copolymers of chloroprene and a comonomer.

2. Description Of The Prior Art

In prior art processes, the chloroprene polymer rubber has been used in the form of chips having a certain size. In molding articles from blocks of rubber, the block is weighed and kneaded with a Bambury mixer or by roller mixing. However, it is difficult to obtain automatic weighing and automatic processing of chips of rubber, and the labor requirements for the processing of the rubber are high. Recently, the blending of rubber with various thermoplastic resin has become increasingly important in expanding the field of use of rubber. It is difficult to blend the rubber and thermoplastic resin in a continuous operation. The problem has been the difficulty in feeding the rubber chips continuously at constant speed to a molding machine such as a uniaxial extruder or a biaxial extruder, and consequently, batch type kneading methods have been employed. This has the disadvantage that a long blending period is required for blending the rubber with a resin which increases the cost. Accordingly, it has been proposed to prepare granular rubber which can be easily weighed and handled without these difficulties and can be fed at constant speed to a molding machine. However, chloroprene polymer rubber has high self-tackiness and it is difficult to obtain granular rubber because of this tackiness of chloroprene polymer rubber particles.

Accordingly, there is a need for a process which can readily prepare non-tacky granular chloroprene polymer rubber.

DETAILED DESCRIPTION OF THE INVENTION

Accordingly, the object of the present invention is to provide a process for preparing granular chloroprene polymer rubber which is not tacky.

The object of the present invention is accomplished by covering the surface of the rubber particles with a silicate or a polysilicic acid.

In the present invention, an aqueous dispersion (latex) of a polymer of chloroprene or a copolymer of chloroprene and comonomer is uniformly mixed with sodium silicate ($Na_2O$—$nSiO_2$ $n = 2 - 4$, especially $n = 3$) at a ratio of 4 – 10 wt. parts of sodium silicate per 100 wt. parts of chloroprene polymer rubber at room temperature. Then, an equivalent of alkaline earth metal salt to sodium silicate is admixed with the latex mixture, or an acid is admixed with the latex mixture to decrease the pH of 10 – 11 to a pH of 2 – 7, preferably a pH of 2 – 4, whereby granular chloroprene polymer rubber precipitates from the latex of chloroprene polymer rubber. The resulting granular rubber is washed with water, dehydrated and dried by conventional methods such as drying under reduced pressure, or centrifugal separation so as to obtain free-flowing granular rubber.

It is known in the prior art to mix sodium silicate with a latex of styrene-butadiene copolymer latex to prepare a coprecipitated composition of the rubber and silicate, which is used as a white reinforcing filler for rubber. The purpose and conditions of this method, however, are different from those of the present invention.

The latex of chloroprene polymer rubber used in the present invention is a cationic latex prepared by polymerizing chloroprene or a mixture of chloroprene and comonomer (such as diene, e.g., butadiene and 2,3-dichlorobutadiene-1,3 and vinyl monomers, e.g., methyl methacrylate and styrene) with a cationic surfactant. The cationic surfactants used can be any of those used previously to prepare cationic latexes of chloroprene polymer, some of which are disclosed in the *Encyclopedia of Chemical Technology*. Some of the typical surfactants are: quaternary ammonium and quaternary pyridinium compounds, laurylmethyl benzyl ammonium chloride, tertiary ammonium salts, alkyl trimethyl ammonium chloride, octadecyl trimethyl ammonium chloride, lauryl trimethyl ammonium chloride and stearyl trimethyl ammonium chloride.

The sodium silicates used can be water glass having the formula:

$$NaO\text{-}nSiO_2$$

wherein $n = 2 - 4$, especially $n = 3$. The amount of 20% aqueous solution of sodium silicate used usually is in the range of 4 – 10 wt. parts, preferably 6 – 8 wt. parts per 100 wt. parts of the rubber latex mixture.

The alkaline earth metal salt added to the latex mixture can, for example, be the chlorides of beryllium, magnesium, calcium, barium and strontium. It is preferable to use calcium chloride or barium chloride. Inorganic or organic acids can be used instead of the alkaline earth metal salts. It is preferred to use a diluted solution such as an aqueous solution of hydrochloric acid (less than 3.5%) or an aqueous solution of acetic acid (less than 10%). If the concentration is too high, the reaction velocity is too high and granular rubber is not formed.

The amount of the alkaline earth metal salt added is more than 0.5, preferably 0.5 – 1 equivalents to sodium silicate and the amount of the acid added is sufficient to reduce the pH of the latex mixture to a pH of 2 – 7. When both an alkaline earth metal salt and an acid are added, the amount of the alkaline earth metal can be less than 0.5, preferably 0.01 – 0.5 equivalents to sodium silicate and the amount of the acid added is sufficient to reduce the pH of the latex mixture to about 2 – 7.

The granular chloroprene polymer rubber prepared by the present invention has a particle size of less than 42 mesh, the particles of granular rubber do not adhere to each other and can be handled easily. The granular rubber can be molded by using molding machines such as uniaxial or biaxial extruders to blend the rubber with pellets of a synthetic resin to obtain a uniform blend composition. The granular rubber prepared according to the process of this invention has a remarkably high green-strength compared with conventional chloroprene polymer rubber.

Having generally described the invention, a more complete understanding can be obtained by reference to certain specific examples, which are provided herein for purposes of illustration only and are not intended to be limiting unless otherwise specified.

EXAMPLE 1

A cationic latex of polychloroprene was produced by polymerizing chloroprene using the formulation and conditions set forth in Table 1.

Table 1

| Formulation of cationic latex of polychloroprene: | |
| --- | --- |
| Monomer: | |
| chloroprene monomer | 100 wt. parts |
| 2,6-di-t-butyl-4-methyl phenol-p-cresol | 0.300 wt. part |
| n-dodecyl mercaptan | 0.330 wt. part |
| Surfactant: | |
| Highamine 2389 laurylmethyl benzyl ammonium chloride | 4 wt. parts |
| water | 110 wt. parts |
| Catalyst: | |
| Initial catalyst: | |
| sodium formaldehyde sulfoxylate | 0.02 wt. part |
| water | 0.625 wt. part |
| Pumped catalyst: (g/hr.) | |
| t-butylhydroperoxide | 0.002 wt. part |
| water | 10 wt. parts |
| Temperature in the polymerization | 40° C |
| Time for the polymerization | 3 hours |

To 100 wt. parts of the resulting cationic latex of polychloroprene (solid component of 33%) was added 8 wt. parts of 20% aqueous solution of sodium silicate (viscosity of 8.5 cps) (Japanese Industrial Standard 3) at room temperature and uniformly mixed. The viscosity of the latex mixture was 68 cps. Next, 12.00 wt. parts of 20% aqueous solution of calcium chloride (equivalent to the amount of sodium silicate) was mixed with the latex mixture with a high speed stirring. When half of the aqueous solution of calcium chloride was added, the viscosity of the latex decreased to form an aqueous dispersion and granular rubber began to precipitate. The resulting granular rubber was washed with water, dehydrated in the conventional manner, and dried with hot air to obtain free-flowing granular polychloroprene rubber which passes 42 mesh sieve. For comparison, 50 wt. parts of the aqueous solution of sodium silicate was admixed with 100 wt. parts of an anionic latex of polychloroprene rubber produced using a rosined soap. Next, 85 wt. parts of the aqueous solution of calcium chloride (equivalent to the amount of sodium silicate) was admixed with the latex mixture. The resulting polychloroprene product was washed, dehydrated and dried in accordance with the former process to obtain flaky polychloroprene having non-uniform shapes. In accordance with the test method of Japanese Industrial Standard K 6301, the mechanical properties of the compositions of the resulting rubber were measured. The results are shown in Table 2:

TABLE 2

| | Example 1 | Anionic latex of polychloroprene (comparison) |
| --- | --- | --- |
| Tensile strength (Kg/cm$^2$) | 235 | 155 |

TABLE 2-continued

| | Example 1 | Anionic latex of polychloroprene (comparison) |
| --- | --- | --- |
| Elongation (%) | 460 | 460 |
| M 300 (Kg/cm$^2$) | 142 | 131 |
| Hardness | 71 | 87 |

EXAMPLES 2 – 5

The process of Example 1 was repeated except varying the amount of 20% aqueous solution of sodium silicate from 2 – 12 wt. parts per 100 wt. parts of the rubber, as shown in Table 3. When the amount of sodium silicate was increased within said range, smaller particles of the granular rubber were obtained. However, granular rubber was prepared only when from 4 – 10 wt. parts of the 20% aqueous solution of sodium silicate was used per 100 wt. parts of rubber latex. The results are shown in Table 3.

TABLE 3

| | Ref. | Exp. 2 | Exp. 3 | Exp. 4 | Exp. 5 | Ref. |
| --- | --- | --- | --- | --- | --- | --- |
| Aqueous solution of sodium silicate (phr) | 2 | 4 | 6 | 8 | 10 | 12 |
| Shape of rubber | flaky | (fine particles passing 42 mesh) | | | | flaky |

EXAMPLES 6 – 9

The process of Example 1 was repeated except using 10% aqueous solution of hydrochloric acid to adjust the pH of the latex mixture of the cationic latex with sodium silicate to 1.5 – 10.1 instead of 20% of calcium chloride. The results are shown in Table 4.

TABLE 4

| | Ref. | Exp. 6 | Exp. 7 | Exp. 8 | Exp. 9 | Ref. |
| --- | --- | --- | --- | --- | --- | --- |
| pH of latex mixture | 1.5 | 2.7 | 3.7 | 4.4 | 6.8 | 10.1 |
| Mooney of rubber | 80 | 92 | 96 | 98 | 100 | 86 |
| Shape of rubber | flaky | (fine particles passing 42 mesh) | | | | flaky |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing granular chloroprene polymer rubber which comprises adding 4 – 10 wt. parts of sodium silicate to 100 wt. parts of a cationic latex of chloroprene polymer or copolymer, then adding an alkaline earth metal salt or an acid to precipitate granules of the chloroprene polymer rubber.

2. The process of claim 1, wherein the alkaline earth metal salt is added at 0.5 – 1 equivalent to sodium silicate.

3. The process of claim 1, wherein the acid is added to provide pH of 2 – 7.

4. The process of claim 1, wherein the surface of the granular rubber is covered with a silicate or a polysilicic acid.

5. The process of claim 1, wherein sodium silicate is a compound having the formula of $Na_2O-nSiO_2$, wherein $n = 2 - 4$.

* * * * *